April 12, 1927. 1,624,504

J. H. PFARR

FLOWER HOLDER

Filed Oct. 21, 1925

INVENTOR.
John H. Pfarr,
BY Wm H Canfield.
ATTORNEY.

Patented Apr. 12, 1927.

1,624,504

UNITED STATES PATENT OFFICE.

JOHN H. PFARR, OF NEWARK, NEW JERSEY.

FLOWER HOLDER.

Application filed October 21, 1925. Serial No. 63,809.

This invention relates to an improved flower holder, which can be used for holding cut flowers but is primarily designed for the holding of growing plants, that permits of their being moistened properly, that permits of the aeration of the soil and the roots of the plant and is particularly designed for use indoors so that the plant can be used as part of the ornamentation and also has the advantage of being simply and cheaply made.

Figure 1:
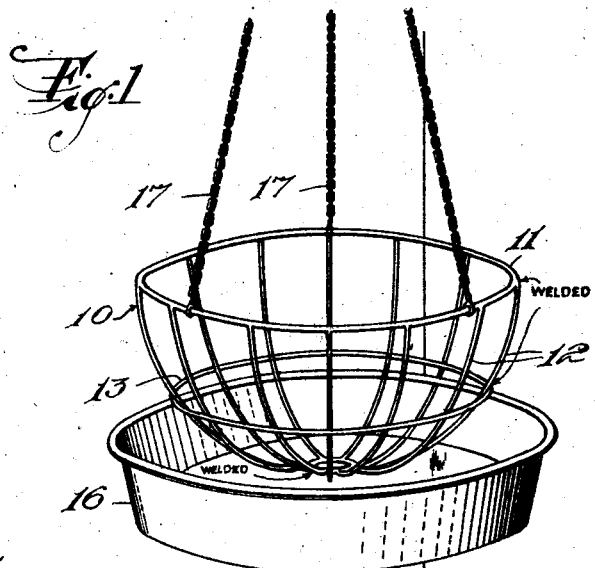
Figure 2:
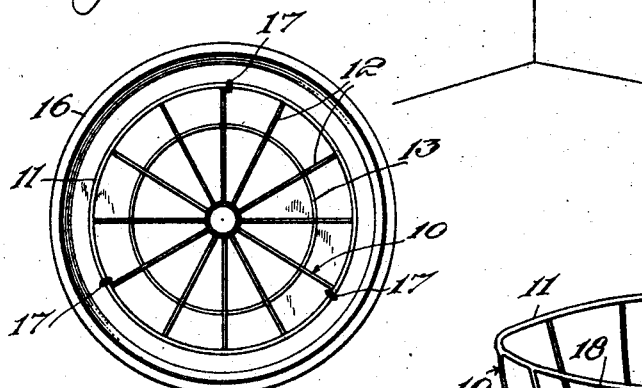
Figure 3:
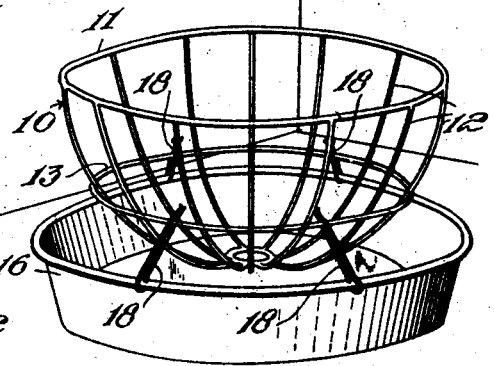
Figure 4:
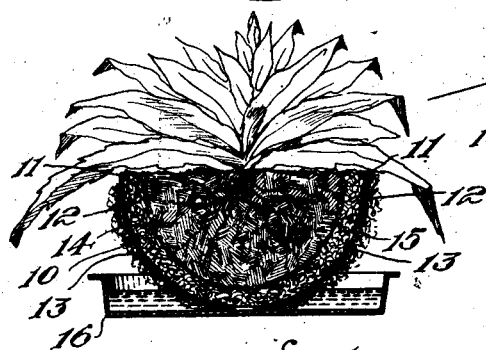

The invention is illustrated in the accompanying drawing in which Figure 1 is a perspective view of a flower holder made according to my invention. Figure 2 is a top view of the device shown in Figure 1. Figure 3 is a view of a modified form and Figure 4 is a perspective view showing how the device holds up the plant and the soil that surrounds the roots.

The holder comprises a cage 10 which is usually made of wire which preferably has a top strand 11, the curved vertical strands 12 and the required number of bracing strands 13, the vertical strands 12 converging at the bottom so that the cage is cup-shape and is of material height so that the soil shown at 14 can be of sufficient quantity to nourish a plant of considerable size.

When the cage is made of wire, in order to prevent the soil falling through, I provide an exterior holding layer shown at 15 which may be formed of moss or any other porous material such as heavy canvas or a metal mesh.

The cage is placed in the centre of a cup-like receptacle 16 which is relatively shallow and which is designed to either act as a support for the cage when the device is used on a table as shown in Figure 3, or to act as a holder for water so that when the plant is watered there is a reservoir established in the receptacle and any drip that comes through the cage from water deposited on the soil is also held in reserve in the receptacle.

The device can be used as a hanging basket by strands such as chains 17 being fastened to the top edge of the cage. The cage is held in the centre of the receptacle by either welding it as shown in Figure 1 or it can be held therein by wire braces 18 secured through perforations in the rim of the receptacle and secured to the cage at the desired points.

In using this flower holder for house plants such as palms, they are placed in the soil which is in the cage and not only can they be supplied with the proper amount of water but the roots receive a proper aeration without the necessity of digging up the soil around the top of the plant. In the case of tender plants this very often destroys the roots or damages them to an extent that injures or kills the plant, whereas, in this flower holder the aeration is sufficient through the sides of the cage and through the soil as the cage is preferably the same diameter as its height and thus presents a great deal of the soil and its porous confining material to the atmosphere.

The receptacle or pan is secured to the cage in any desired way, either by welding as in Figure 1 or by bracing strands as in Figure 3 so long as the bottom or lowest part of the cage within the receptacle is on the bottom of the receptacle or at least so close thereto as to insure that practically all the water in the receptacle can be absorbed by plants in the cage. This also allows a moistening of the plants by a small or shallow amount of water in the receptacle.

I claim:

1. A flower holder comprising a wire cup-like cage and a flat cup-like receptacle of larger diameter than the cage, the cage being secured with its bottom on the bottom of the receptacle.

2. A flower holder comprising a cup-like wire cage of a diameter substantially equal to its height, and a receptacle of flat form to the centre of which the cage is secured at its bottom so that the receptacle forms the bottom of the cage.

3. A flower holder comprising a cage and a shallow receptacle secured to the bottom of the cage and in direct contact therewith so that any water in the receptacle can all be absorbed by soil in the cage.

In testimony whereof I affix my signature.

JOHN H. PFARR.